June 4, 1935.  E. J. DREIS  2,003,529
CLUTCH FOR PUNCH PRESSES
Filed June 22, 1931   2 Sheets-Sheet 1

INVENTOR.
Edward J. Dreis
BY
Townsend, Loftus & Affett
ATTORNEYS.

June 4, 1935.  E. J. DREIS  2,003,529
CLUTCH FOR PUNCH PRESSES
Filed June 22, 1931   2 Sheets-Sheet 2
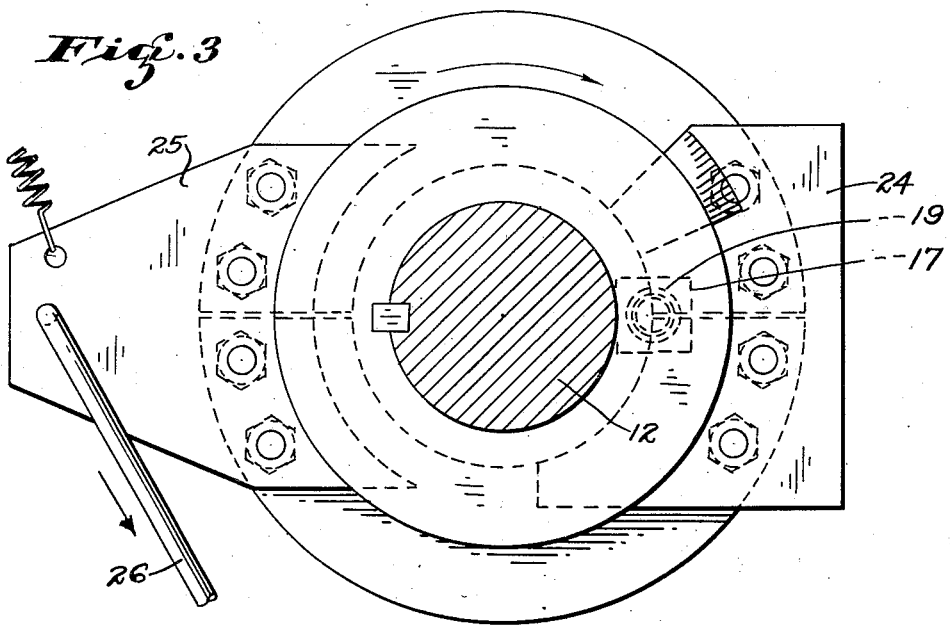
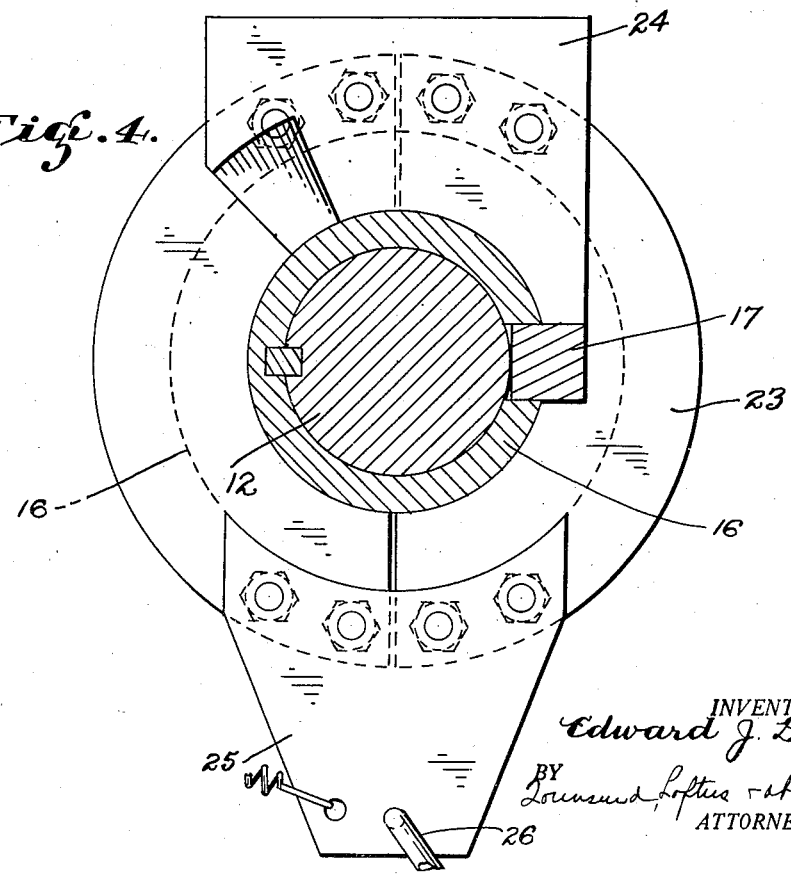
INVENTOR.
Edward J. Dreis.
ATTORNEYS.

Patented June 4, 1935

2,003,529

UNITED STATES PATENT OFFICE 2,003,529

CLUTCH FOR PUNCH PRESSES

Edward J. Dreis, San Francisco, Calif.

Application June 22, 1931, Serial No. 545,935

1 Claim. (Cl. 192—25)

This invention relates to punch presses and similar machines and particularly pertains to a clutch mechanism therefor.

It is the principal object of the present invention to provide a simple clutch of the character referred to which will automatically and positively disengage at the end of each revolution of the driven member of the clutch.

In carrying the invention into practice, I provide a driving and a driven member associated with which is an operative clutch dog which normally tends to form a driving connection therebetween. This dog is automatically moved and held in inoperative position at the end of each revolution of the driven member and can be again rendered effective only by the operator releasing it through the medium of the control mechanism.

One form which the invention may assume is exemplified in the following description and illustrated by way of example in the accompanying drawings, in which:

Fig. 3 is a transverse sectional view through the clutch showing the dog release mechanism in one position, the section being taken on line III—III of Fig. 1.

Fig. 4 is a view similar to Fig. 3 but showing the release mechanism in another position, the section being taken on line IV—IV of Fig. 1.

Figure 1:
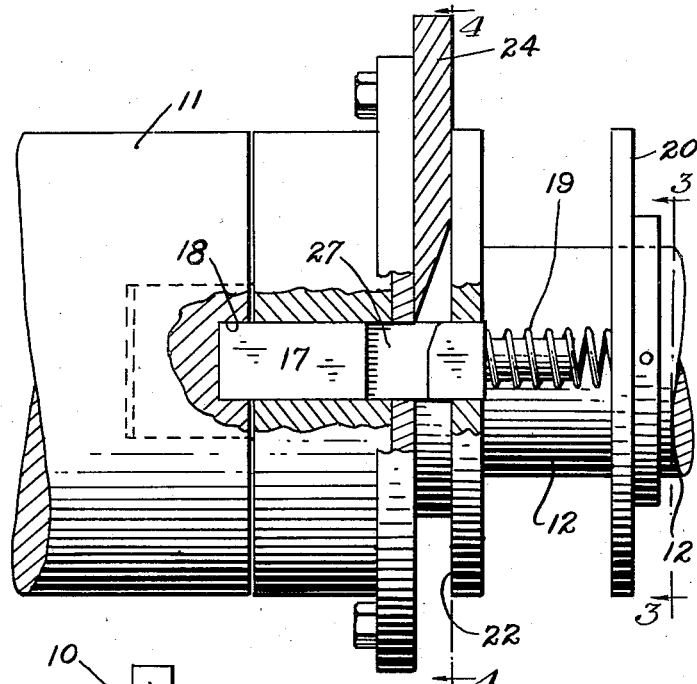
Fig. 1 is a view of my improved clutch mechanism with parts in section to show certain features of construction.
Figure 2:
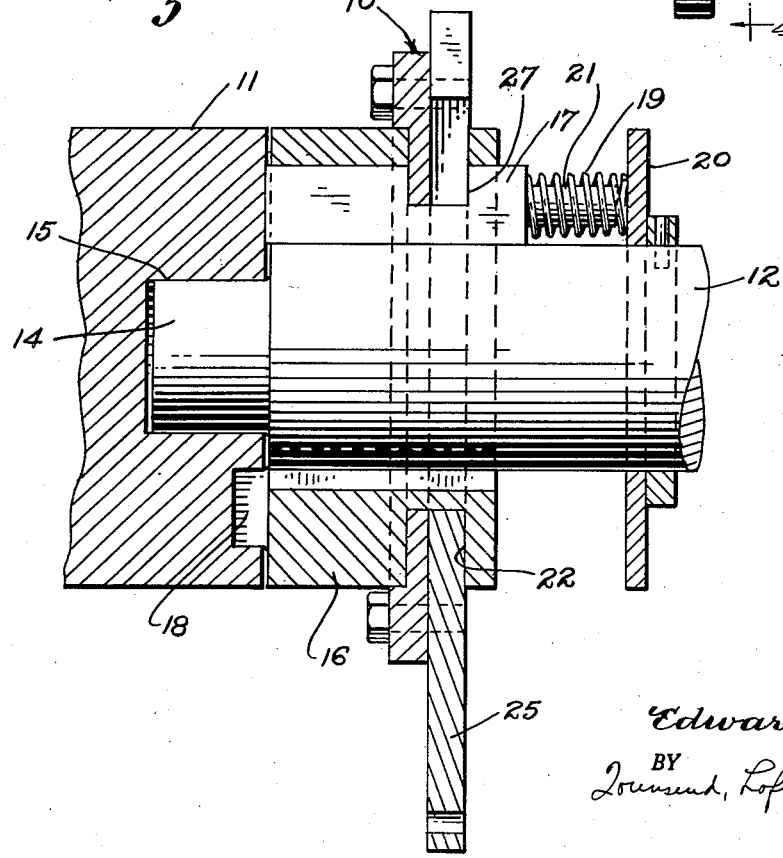
Fig. 2 is a central longitudinal section through my improved clutch mechanism.

Referring more particularly to the accompanying drawings, 10 indicates a clutch mechanism for punch presses or similar machines, which clutch mechanism is automatically rendered ineffective each time the driven shaft makes one revolution.

In the drawings 11 indicates the hub of a flywheel or other driving member which revolves concentrically to a driven shaft 12. This may be the crank shaft of a punch press or any other driven member which it is desired to operate. The shaft 12 as herein shown is provided with a reduced pilot member 14 engaging a bearing 15 in the end of the hub 11.

Mounted on the driven shaft 12 and suitably keyed thereto is a sleeve 16. Mounted in a suitable guide in this sleeve for movement coaxially thereof is a locking dog 17. This locking dog 17 is positioned in a radial position where its inner surface bears on the outer periphery of the shaft 12. Disposed in a similar radial position is a socket 18 formed in the end of the hub 11, which socket is adapted to register with the inner end of the locking dog 17 so that the latter may project therein. A compression spring 19 is interposed between the outer end of the locking dog 17 and a stationary collar 20 on the shaft 12, which spring normally tends to urge the locking dog 17 into engagement with the socket 18. It will be noticed that the spring 19 is arranged about a cylindrical reduced end 21 of the locking dog.

As the locking dog 17 is guided for reciprocation coaxially of the sleeve, when the socket 18 registers therewith the spring 19 will normally urge the locking dog into engagement with the socket and form a driving connection between the sleeve and the hub 11. As the sleeve 16 is keyed to the shaft 12, such driving engagement between the sleeve and the hub will cause the shaft 12 to be driven from the hub of the flywheel or driving member.

The sleeve 16 is formed with an annular circumscribing channel 22 within which a two-part ring 23 is loosely mounted. A trip cam 24 is secured to this ring and projects within the annular channel 22 as illustrated. At a point diametrically opposed to the cam 24 the ring is fitted with a projecting crank arm 25 to which an operating rod 26 may be connected so that the ring together with the cam 24 may be revolved in the annular channel 22 relative to the sleeve 16.

It will be noticed that the locking dog 17 is provided with a recess 27 which, when the locking dog is in its ineffective position, registers with the annular channel 22 and in effect forms a continuation thereof so that when the locking dog is in this position and in register with the cam 24 it will be held from engagement with the socket 18. However, as the hub 11 is continuously revolving, if the cam 24 is moved to a position where the outer face of the recess 27 of the locking dog 17 is no longer in engagement with the cam 24, the spring 19 will press the locking dog into engagement with the end of the hub 11 so that when the recess 18 aligns with the locking dog the latter will project therein and form the driving engagement. Upon completing its revolution, however, the locking dog will again register with the cam 24 and such engagement will, due to the contour of the cam surface, move the locking dog out of engagement with the recess and interrupt the driving connection between the shaft 12 and the hub 11.

In Fig. 3 I have shown the starting position of the crank arm 25 and the cam 24. In this position the locking dog is in register with the cam 24 and held out of engagement with the recess 18. By movement of the operating rod 26 in the direction of the arrow shown in Fig. 3, the cam 24 is moved out of register with the end of the locking dog 17 and as the socket 18 aligns with the locking dog the latter will engage the same and form a driving connection between the hub and the driven shaft 12. When the rod 26 is released, it is automatically returned to the position shown in Fig. 3 and as the shaft 12 completes its one revolution, the outer face of the recess 27 in the dog will engage the cam 24 and this engagement will withdraw the locking dog from engagement with the socket 18 and interrupt the driving connection.

If the rod 26 is released the cam automatically returns to the position shown in Fig. 3 to interrupt the drive after one revolution. If the rod 26 is not released it will remain in the position shown in Fig. 4 and interrupt the drive before a complete revolution has been made.

A clutch mechanism of the type herein disclosed enables a punch press to operate with a greater degree of safety than hitherto because it performs but one operation and ceases and does not continue until the operator again by a positive act places it in operation.

From the foregoing it is obvious that I have provided a clutch mechanism which is rendered ineffective automatically after each revolution of the driven shaft, which clutch mechanism is comparatively simple in construction and efficient in operation.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

In combination with the hub of a flywheel, a clutch mechanism for association with said hub, said mechanism including a driven shaft arranged coaxially of the hub and adjacent thereto and concentric therewith and extending from one face of the hub, a sleeve of an external diameter substantially agreeing with the diameter of the hub and concentrically mounted on said shaft and keyed thereto, one face of said sleeve being closely contiguous to said face of the hub, a guide formed coaxially of the hub between the exterior of the shaft and the exterior of the sleeve, a locking dog reciprocably mounted in said guide, the face of said hub being formed with a socket in which said locking dog is adapted to project when the same come in register to lock the sleeve to the hub, said sleeve having a peripheral channel formed therein, a two-part ring loosely mounted in said channel, a trip cam secured to said ring and projecting in said channel, said locking dog having a recess formed therein registering with said channel when the locking dog is disengaged from said socket, said trip cam being operative to engage the recess in said clutch dog when the latter is engaged with said socket and to move said clutch dog endwise away from said hub and disengage it from said socket, said cam acting automatically after a revolution of said sleeve subsequent to the release of the clutch dog by the cam to disengage the dog from the hub.

EDWARD J. DREIS.